Dec. 3, 1929.   H. L. GRAHAM   1,738,101
DRILL DRIVE STEM BUSHING
Filed March 5, 1929
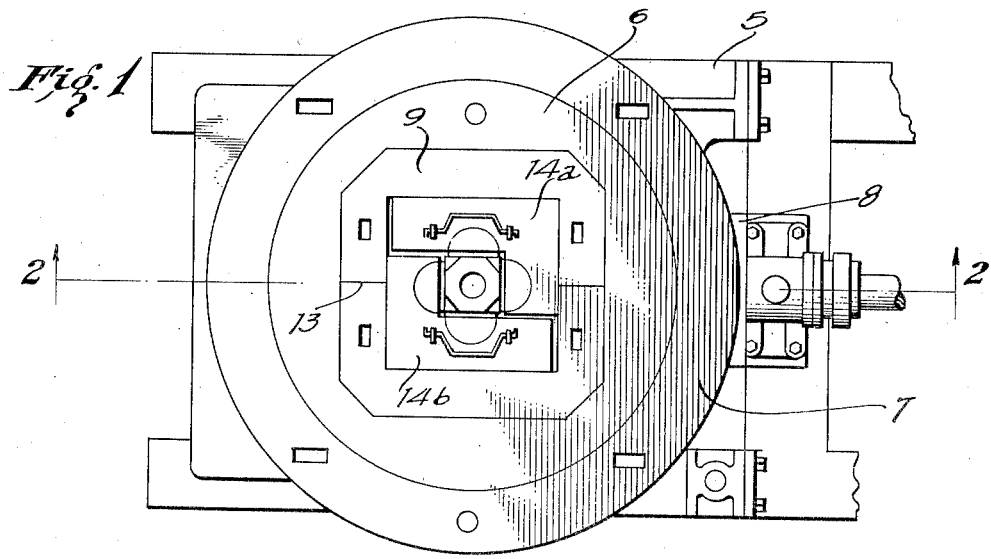
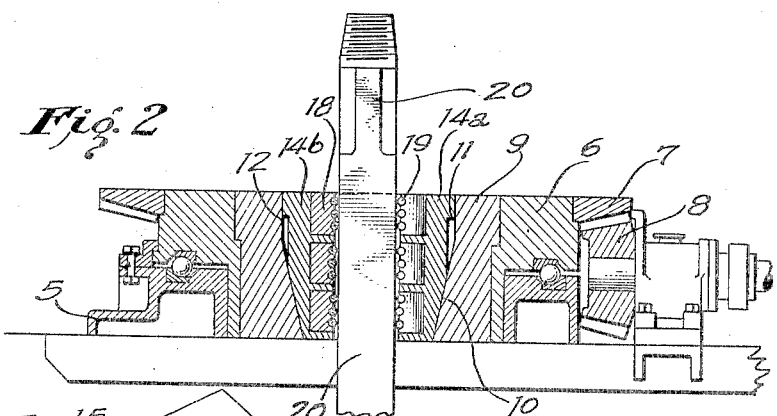
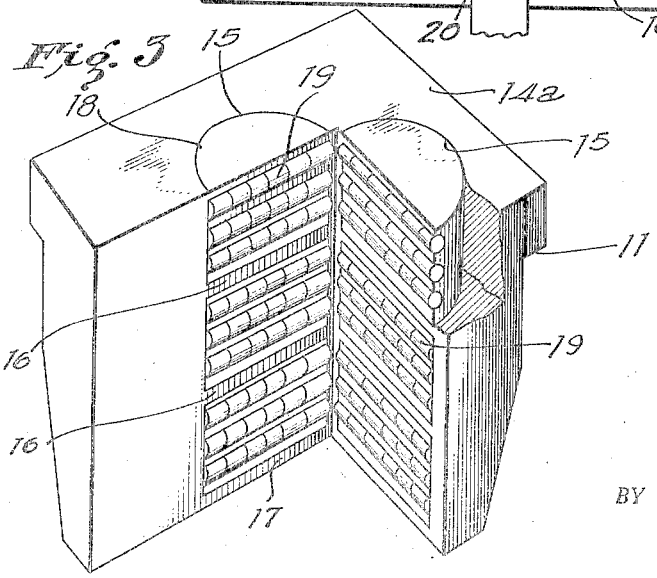
INVENTOR.
Homer L. Graham
BY
ATTORNEYS Patented Dec. 3, 1929

1,738,101

UNITED STATES PATENT OFFICE

HOMER L. GRAHAM, OF LA HABRA, CALIFORNIA, ASSIGNOR OF ONE-HALF TO W. H. TAYLOR AND V. W. BAILEY, BOTH OF PASADENA, CALIFORNIA

DRILL-DRIVE-STEM BUSHING

Application filed March 5, 1929. Serial No. 344,341.

This invention relates to a bushing structure for engaging a drill drive stem employed with a rotary table in a rotary drilling outfit for wells.

In rotary drilling outfits as commonly employed in oil well drilling, a drill string having boring tools is rotated and advanced longitudinally. A rotary table is driven from a source of power through intermediate gears. The drill string has a drive stem at the top which is slidably connected to the rotary table by means of a bushing structure. The bushing structure as currently used comprises a master bushing detachably mounted on the table and a drive bushing having a tapered portion seated in the master bushing. Drive stems are employed having flat surfaces for driving and the more common type of drive stem is square in section. Such drill stems wear on the sides and especially at the corners so that they eventually become loose. Wear is due to the initial clearance between the drive stem and coacting walls of the drive bushing which causes the driving forces to be applied to the drive stem bases adjacent the advance corners. The present invention relates broadly to such structure.

The objects of this invention are first, to provide a self alining bushing which will accommodate the position of its bearing surfaces coacting with the drill drive stem surfaces to maintain a full surface contact; second, to provide a set of liners for the drive bushings coupled thereto by joints to permit movement of the drive stem bearing faces in the plane of rotation of the drill string without shifting the points of bearing contact between the liners and the drive stem; and third, to provide details of structure whereby anti-friction bearings are provided between the drive stem and drive bushings.

These objects together with other objects and corresponding accomplishments are obtained by means of the embodiments of my invention illustrated in the accompanying drawings, in which:—

Fig. 1 is a plan view of a rotary table and a drill drive stem mounted therein; Fig. 2 is a section as seen on the line 2—2 of Fig. 1; and Fig. 3 is a perspective view of one-half of the drive bushing.

Referring more particularly to the drawings, 5 indicates a table base upon which is mounted a rotary table 6. The rotary table has a bevel gear formed at its periphery and marked 7 by means of which it is driven through a system of gears indicated generally by 8. A split master bushing 9 is detachably mounted in the table. The structure as described is a well known type of rotary drilling outfit and is shown for illustrative purposes only.

The master bushing has an opening provided with a tapered seat portion 10 and a shoulder 11 at its juncture with a straight portion 12. The master bushing is split at 13 transverse of the opening formed therein. Mounted in the opening of the master bushing is a drive bushing consisting of split sections $14^a$ and $14^b$ of like form. The drive bushing has outer seating faces corresponding to the seat in the master bushing, and is split adjacent opposite diagonal corners. Semi-cylindrical sockets 15 are provided, there being two reinforcement ribs 16 shown in each socket so as to divide each socket into three pockets and there being a bottom reinforcement wall 17 for each socket. Mounted in each pocket of a socket is a liner 18 conforming in shape to the socket bearing wall and having a flat inner face provided with grooves in which are mounted rollers. There are three liner sections in each socket constituting in effect a single liner for the socket. A drill drive stem 20 square in cross section passes through the drive bushing. The liners engaging the drive stem are provided with grooves in which are mounted rollers 19, an anti-friction bearing for longitudinal sliding of the drive stem.

It will be noted that upon rotation of the table, drive stem 20 is caused to rotate therewith through the bushings. The liners may turn in their sockets so as to maintain an over-all contact of their bearing faces with the corresponding faces of the drive stem. Thus, wear is distributed over the liner faces and drive stem and the driving force is likewise distributed. Wear at the corners of the drive stem is thus prevented. Furthermore, the rollers 19 aid in decreasing wear.

What I claim is:—

1. The combination of a rotary drive member, a bushing mounted therein having a hole extending therethrough, liner sockets in said drive member at the walls of said hole, and liners for engaging a drive stem mounted in said sockets to engage the drive stem, said liners having bearing faces coacting with the socket faces so that said liners are freely turnable in said sockets, said liners having their inner faces arranged to engage the drive stem for rotating the latter with said member.

2. The combination of a rotatable drive member, there being a hole extending through said member, liner sockets in said member at the walls of said hole, and liners for engaging a drive stem mounted in said sockets to engage the drive stem, said liners having bearing faces coacting with the socket faces so that said liners are freely turnable in said sockets, said liners having their inner faces arranged to engage said drive stem for rotating the latter with said member.

3. The combination of a rotary member, a drive bushing mounted therein having a hole extending therethrough, liner sockets of cylindrical form in said drive bushing at the walls of said hole with their axes extending lengthwise of the axis of rotation of said member, and liners for engaging a drive stem mounted in said sockets, said liners being freely turnable in said sockets and having their inner faces arranged to engage the drive stem for rotating the latter with said member.

4. The combination of a rotatable drive member, a bushing mounted therein having a hole extending therethrough, a liner socket in said bushings at the walls of said hole, liners for engaging a drive stem mounted in said sockets and having bearing faces coacting with the socket faces, said liners having drive faces defining a non-circular shaped hole to receive a correspondingly shaped non-circular drive stem and being freely turnable in said sockets to accommodate them to said drive stem.

5. The combination of a rotatable drive member, a bushing mounted therein having a hole extending therethrough, liner sockets of cylindrical form in said bushing at the walls of said holes with their axes extending lengthwise of the axes of rotation of said drive member, liners for engaging a drive stem mounted in said socket, said liners having bearing faces defining a polygonal shaped hole to receive a correspondingly shaped polygonal drive stem, said liners being freely turnable in said sockets to accommodate them to said drive stem.

6. In a rotary drilling outfit, a rotary table, a split drive bushing mounted therein, said bushing having a hole extending therethrough, liner sockets in said bushing at the walls of said hole, and liners for engaging a drive stem mounted in said sockets, said liners having bearing faces coacting with the socket faces so that said liners are freely turnable in said sockets to accommodate them to said drive stem.

7. In a rotary drilling outfit, a rotary table, a split drive bushing mounted therein, said bushing having a hole extending therethrough, liner sockets of cylindrical form in said bushing at the walls of said hole with their axes extending lengthwise of the axes of rotation of said member, and liners for engaging a drive stem mounted in said sockets, said liners being freely turnable to accommodate themselves to said drive stem.

8. In a rotary drilling outfit, a rotary table, a master bushing mounted therein, a split drive bushing mounted in said master bushing, said drive bushing having a hole extending therethrough, liner sockets in said bushing at the walls of said hole, and liners for engaging a drive stem mounted in said sockets, said liners having bearing faces coacting with the socket faces so that said liners are freely turnable to accommodate their bearing faces to the drive stem.

9. In a rotary drilling outfit, a rotary table, a master bushing mounted therein, a split drive bushing mounted in said master bushing, said drive bushing having a hole extending therethrough, liner sockets of cylindrical form in said drive bushing at the walls of said hole with their axes extending lengthwise of the axis of rotation of said table, liners for engaging a drive stem mounted in said sockets, said liners being freely turnable in said socket to accommodate their bearing faces to said drive stem.

10. In a rotary drilling outfit, a rotary table, a master bushing mounted therein, a split drive bushing mounted in said master bushing, said drive bushing having a hole extending therethrough, liner sockets in said drive bushing at the walls of said hole, and liners for engaging a drive stem mounted in said sockets, said liners having bearing faces coacting with the socket faces so that said liners are freely turnable in said sockets and having bearing faces for said drive stem defining a polygonal shaped hole to receive a correspondingly shaped polygonal drive stem.

11. In a rotary drilling outfit, a rotary table, a master bushing mounted therein, a split drive bushing mounted in said master bushing, said drive bushing having a hole extending therethrough, liner sockets of cylindrical form in said drive bushing at the walls of said hole with their axes extending lengthwise of the axis of rotation of said table, liners for engaging a drive stem mounted in said socket and being freely turnable therein, and roller bearings extending along the bearing faces of said liners.

In witness that I claim the foregoing I have hereunto subscribed my name this 28th day of December, 1928.

HOMER L. GRAHAM.